(12) United States Patent
Scuderi

(10) Patent No.: US 11,624,307 B2
(45) Date of Patent: *Apr. 11, 2023

(54) BOTTOMING CYCLE POWER SYSTEM

(71) Applicant: Scuderi Group, Inc., West Springfield, MA (US)

(72) Inventor: Salvatore C. Scuderi, Westfield, MA (US)

(73) Assignee: SCUDERI GROUP, INC., West Springfield, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/580,777

(22) Filed: Jan. 21, 2022

(65) Prior Publication Data

US 2022/0325649 A1  Oct. 13, 2022

Related U.S. Application Data (63) Continuation of application No. 17/224,200, filed on Apr. 7, 2021, now Pat. No. 11,286,832.

(51) Int. Cl.
*F01N 3/02* (2006.01)
*F01N 5/02* (2006.01)
(Continued)

(52) U.S. Cl.
CPC ............... *F01N 5/02* (2013.01); *F01N 3/02* (2013.01); *F01N 3/0857* (2013.01); *F01N 5/04* (2013.01)

(58) Field of Classification Search
CPC . F01N 3/02; F01N 3/0857; F01N 5/02; F01N 5/04; F01N 2240/02;
(Continued)

(56) References Cited

U.S. PATENT DOCUMENTS

| 4,270,365 A | 6/1981 | Sampietro |
| 4,996,845 A | 3/1991 | Kim |

(Continued)

OTHER PUBLICATIONS

Kennedy, et. al., Inverted Brayton Cycle With Exhaust Gas Condensation, Journal of Engineering for Gas Turbines and Power, vol. 140 / 111702-1, Nov. 2018.
(Continued)

*Primary Examiner* — Audrey B. Walter
*Assistant Examiner* — Dapinder Singh
(74) *Attorney, Agent, or Firm* — Heslin Rothenberg Farley & Mesiti P.C.

(57) ABSTRACT

A bottoming cycle power system includes a turbine-generator. The turbine-generator includes a turbo-expander and turbo-compressor disposed on a turbo-crankshaft. The turbo-expander is operable to rotate the turbo-crankshaft as a flow of exhaust gas from a combustion process passes through the turbo-expander. The turbo-compressor is operable to compress the flow of exhaust gas after the exhaust gas passes through the turbo-expander. An exhaust gas heat exchanger includes first and second flow paths operable to exchange heat therebetween. The first flow path is operable to receive the flow of exhaust gas from the turbo-expander prior to the exhaust gas being compressed by the turbo-compressor. The second flow path is operable to receive the flow of exhaust gas from the turbo-compressor after the exhaust gas has been compressed by the turbo-compressor.

19 Claims, 6 Drawing Sheets

(51) Int. Cl.
  *F01N 5/04* (2006.01)
  *F01N 3/08* (2006.01)
(58) Field of Classification Search
  CPC .............. F01N 2240/22; F01N 2570/10; F01N 2570/22; F01K 23/065; F01K 23/10; F01K 23/101; F01K 9/003; F02G 5/02; F02G 5/04; Y02T 10/12
  See application file for complete search history.

(56) References Cited

U.S. PATENT DOCUMENTS

| | | | |
|---|---|---|---|
| 6,178,735 B1 | 1/2001 | Frutschi | |
| 6,301,890 B1 | 10/2001 | Zeretzke | |
| 6,397,596 B1 | 6/2002 | Boyle | |
| 6,772,582 B2 * | 8/2004 | Reissig | F02C 1/04 60/39.183 |
| 7,124,589 B2 | 10/2006 | Neary | |
| 7,958,731 B2 | 7/2011 | McBride et al. | |
| 8,122,718 B2 | 2/2012 | McBride et al. | |
| 8,419,813 B2 * | 4/2013 | Hoteit | C10J 3/725 423/644 |
| 8,783,035 B2 | 7/2014 | Milam et al. | |
| 8,888,895 B1 | 11/2014 | Fisher et al. | |
| 9,180,401 B2 | 11/2015 | Hamad | |
| 9,486,733 B2 | 11/2016 | Hamad | |
| 10,047,638 B2 | 8/2018 | Adachi et al. | |
| 10,151,498 B2 | 12/2018 | Moghaddam et al. | |
| 10,774,733 B2 | 9/2020 | Scuderi | |
| 11,118,490 B2 | 9/2021 | Coldren | |
| 2008/0178590 A1 | 7/2008 | Chillar et al. | |
| 2009/0031999 A1 | 2/2009 | Erickson | |
| 2012/0023947 A1 | 2/2012 | Kulkarni | |
| 2014/0360204 A1 | 12/2014 | Moorkanikkara | |
| 2015/0258713 A1 | 9/2015 | Valdmaa | |
| 2015/0285122 A1 | 10/2015 | Yamashita | |
| 2015/0330679 A1 | 11/2015 | Bowdish | |
| 2015/0361876 A1 | 12/2015 | Schiliro | |
| 2015/0361877 A1 | 12/2015 | Gulen | |
| 2016/0047603 A1 | 2/2016 | Filippone | |
| 2018/0216532 A1 | 8/2018 | Smith | |
| 2018/0371954 A1 | 12/2018 | Copeland | |
| 2019/0120131 A1 * | 4/2019 | Scuderi | F01N 3/005 |
| 2019/0316846 A1 | 10/2019 | Filippone | |
| 2020/0141353 A1 | 5/2020 | Filippone | |
| 2020/0263568 A1 | 8/2020 | Copeland | |
| 2020/0271050 A1 | 8/2020 | Dunn | |

OTHER PUBLICATIONS

Precision Combustion, Inc., DOE Award No. DE-SC0017221, High-Efficiency Post Combustion Carbon Capture System, National Carbon Capture Center Test 2020.

Brunetti, et al., Membrane condenser as emerging technology for water recovery and gas pre-treatment: current status and perspectives, BMC Chemical Engineering, https://doi.org/10.1186/s42480-019-0020-x, Sep. 12, 2019 2019.

* cited by examiner

BOTTOMING CYCLE POWER SYSTEM

CROSS REFERENCE TO RELATED APPLICATIONS

This application is a continuation of, and claims priority to, U.S. patent application Ser. No. 17/224,200, filed on Apr. 7, 2021 and titled: BOTTOMING CYCLE POWER SYSTEM. The content of the prior application is hereby incorporated by reference herein in its entirety.

TECHNICAL FIELD

The present disclosure relates to systems for delivering power. More specifically, the disclosure relates to a bottoming cycle power system for delivering power, such as mechanical or electrical power.

BACKGROUND

One of the most challenging aspects of today's energy technologies is to effectively convert waste heat from a combustion process into useable power. Such power can be in the form of electrical or mechanical power for use in stationary and/or mobile applications.

Methods of converting waste heat into useful forms of energy are commonly referred to as bottoming cycles. Systems that utilize a bottoming cycle to provide power are referred to herein as bottoming cycle power systems.

Systems that utilize a fuel combustion process in an internal combustion engine (such as a piston engine or a turbine engine) as the motive force to drive a crankshaft for providing power are referred to herein as primary power systems. In most primary power systems the efficiency of the system ranges from below 30% to a high of almost 50%. This means that the majority of energy contained in the fuel is lost in the form of heat to the atmosphere through either the cooling circuit or exhaust of the internal combustion engine.

However, the waste energy contained in exhaust gas from the internal combustion engine of a primary power system may be utilized as the energy input for a bottoming cycle power system. If enough useful work can be recovered from such a bottoming cycle power system, the bottoming cycle power system could then be used to supplement the output of the primary power system for a more efficient overall system output.

One type of bottoming cycle is known as an inverted Brayton cycle. The inverted Brayton cycle typically includes an expansion turbine (or turbo-expander) that receives a flow of exhaust gas from a combustion process of an internal combustion engine. The exhaust gas carries a significant amount of heat energy. However the flow of exhaust gas is typically only at, or slightly above, atmospheric pressure. For example, the exhaust gas may exit the internal combustion engine at about 900-1100 degrees Fahrenheit (F), but at only a few pounds per square inch (psi) above atmospheric pressure. This makes recovering useful work difficult.

In the inverted Brayton cycle, the exhaust gas flows through a turbo-expander where it typically exits the turbo-expander at below atmospheric pressures (or vacuum pressures). The vacuum pressures are caused by a compression turbine (or turbo-compressor), which is the final step in the inverted Brayton cycle. That is, the exhaust gas enters the turbo-compressor where it may be pumped back to atmospheric pressure. The amount of energy recovered from an inverted Brayton cycle is the energy produced by the turbo-expander minus the energy consumed by the turbo-compressor. Therefore, the less work needed by the turbo-compressor to compress the expanded volume of exhaust gas, the greater the net-work produced from the inverted Brayton cycle.

Various prior art cooling systems can be utilized to reduce the specific volume of exhaust gas prior to entering the turbo-compressor in an inverted Brayton cycle and, therefore, reduce the amount of work required by the turbo-compressor to compress the exhaust gas. Problematically however, these cooling systems consume a significant amount of energy due to pumps and/or other energy consuming devices needed to circulate coolants through the cooling system.

Moreover, the more the exhaust gas is cooled in order to produce as much net-work from the inverted Brayton cycle (or other bottoming cycles) as possible, the more the density of the cooled exhaust gas will increase. Problematically, if the exhaust gas is cooled to ambient or near ambient temperatures, the exhaust gas will become too dense to flow up the required stack of the internal combustion engine. In that case, the exhaust gas must be re-heated as it exits the turbo-compressor, which may significantly reduce the amount of net-work that the inverted Brayton-cycle can provide.

Further, the exhaust gas of an internal combustion engine contains a significant amounts of water vapor and carbon dioxide as naturally occurring by-products of the combustion process. Problematically, the water vapor has a relatively high specific volume and mass, which causes an unwanted burden on the compression work of the compressor in the inverted Brayton cycle. Also problematically, prior art carbon dioxide capture systems generally consume a significant amount of energy to remove the carbon dioxide from the exhaust gas, which would also cause a burden on the efficiency of the internal combustion engine.

Accordingly, there is a need for a bottoming cycle power system, such as an inverted Brayton bottoming cycle power system, wherein the specific volume of flow of exhaust gas is significantly and efficiently reduced after exiting the turbo-expander and prior to entering the turbo-compressor. More specifically, there is a need to reduce the work required of the turbo-compressor in a bottoming cycle power system to increase the overall efficiency of that bottoming cycle power system.

Further there is a need to efficiently decrease the volume and mass of water vapor in a flow of exhaust gas prior to entering the turbo-compressor of a bottoming cycle power system. Additionally, there is a need to efficiently re-heat exhaust gas that has been cooled to ambient or near ambient temperatures, in order to enable the exhaust gas to flow up an internal combustion engine's stack with little drain on the net-work of the associated bottoming cycle power system. Additionally, there is a need to reduce the energy required in any carbon dioxide capture system used to remove the carbon dioxide from exhaust gas and, therefore, help to maintain the efficiency of the internal combustion engine associated with the bottoming cycle power system.

BRIEF DESCRIPTION

The present disclosure offers advantages and alternatives over the prior art by providing a bottoming cycle power system for receiving a flow of exhaust gas from a combustion process. The bottoming cycle power system includes an exhaust gas heat exchanger that has a first and a second flow path. The first flow path receives hot exhaust gas after it has exited the turbo-expander and prior to entering the turbo-compressor of the bottoming cycle power system. The second flow path receives cooled exhaust gas after it has exited the turbo-compressor. The cooled exhaust gas provides a first stage of cooling of the hot exhaust gas as it passes through the exhaust gas heat exchanger. An exhaust gas processing system is disposed between the exhaust gas heat exchanger and the turbo-compressor to provide at least a second stage of cooling of the exhaust gas prior to entering the turbo-compressor.

A bottoming cycle power system in accordance with one or more aspects of the present disclosure includes a turbine-generator. The turbine-generator includes a turbo-expander and turbo-compressor disposed on a turbo-crankshaft. The turbo-expander is operable to rotate the turbo-crankshaft as a flow of exhaust gas from a combustion process passes through the turbo-expander. The turbo-compressor is operable to compress the flow of exhaust gas after the exhaust gas passes through the turbo-expander. An exhaust gas heat exchanger includes first and second flow paths operable to exchange heat therebetween. The first flow path is operable to receive the flow of exhaust gas from the turbo-expander prior to the exhaust gas being compressed by the turbo-compressor. The second flow path is operable to receive the flow of exhaust gas from the turbo-compressor after the exhaust gas has been compressed by the turbo-compressor.

A combined power system in accordance with one or more aspects of the present disclosure includes a primary power system and a bottoming cycle power system. The primary power system includes an internal combustion engine having a rotatable crankshaft. The engine is operable to use fuel in a combustion process to deliver primary power to the engine crankshaft. The combustion process produces a flow of exhaust gas. The bottoming cycle power system includes a turbine-generator. The turbine-generator includes a turbo-expander and turbo-compressor disposed on a turbo-crankshaft. The turbo-expander is operable to rotate the turbo-crankshaft as the flow of exhaust gas from the combustion process passes through the turbo-expander. The turbo-compressor is operable to compress the flow of exhaust gas after the exhaust gas passes through the turbo-expander. An exhaust gas heat exchanger includes first and second flow paths operable to exchange heat therebetween. The first flow path is operable to receive the flow of exhaust gas from the turbo-expander prior to the exhaust gas being compressed by the turbo-compressor. The second flow path is operable to receive the flow of exhaust gas from the turbo-compressor after the exhaust gas has been compressed by the turbo-compressor.

A carbon dioxide capture system in accordance with one or more aspects of the present disclosure includes a first capture tank, a carbon dioxide compressor and a compressor coolant loop. The first capture tank contains carbon dioxide absorbent material operable to absorb carbon dioxide from a flow of exhaust gas. The first capture tank includes an exhaust gas inlet port, an exhaust gas outlet port and a carbon dioxide outlet port. The exhaust gas inlet port of the first capture tank is connected to the flow of exhaust gas prior to the exhaust gas passing through the carbon dioxide absorbent material. The exhaust gas outlet port of the first capture tank is connected to the flow of exhaust gas after the flow of exhaust gas has passed through carbon dioxide absorbent material. The carbon dioxide compressor is connected to the carbon dioxide outlet port of the first capture tank. The carbon dioxide compressor operates to pump carbon dioxide out of the carbon dioxide outlet port of the first capture tank. The compressor coolant loop is connected between the carbon dioxide compressor and the first capture tank. The compressor coolant loop operates to flow a compressor coolant fluid to remove heat of compression from the compressor and to transfer the heat of compression to the first capture tank. The heat of compression operates to release a portion of the carbon dioxide absorbed by the carbon dioxide absorbent material in the first capture tank.

It should be appreciated that all combinations of the foregoing concepts and additional concepts discussed in greater detail below (provided such concepts are not mutually inconsistent) are contemplated as being part of the inventive subject matter disclosed herein and may be used to achieve the benefits and advantages described herein.

DRAWINGS

The disclosure will be more fully understood from the following detailed description taken in conjunction with the accompanying drawings, in which.

DETAILED DESCRIPTION

Certain examples will now be described to provide an overall understanding of the principles of the structure, function, manufacture, and use of the methods, systems, and devices disclosed herein. One or more examples are illustrated in the accompanying drawings. Those skilled in the art will understand that the methods, systems, and devices specifically described herein and illustrated in the accompanying drawings are non-limiting examples and that the scope of the present disclosure is defined solely by the claims. The features illustrated or described in connection with one example maybe combined with the features of other examples. Such modifications and variations are intended to be included within the scope of the present disclosure.

The terms "significantly", "substantially", "approximately", "about", "relatively," or other such similar terms that may be used throughout this disclosure, including the claims, are used to describe and account for small fluctuations, such as due to variations in processing from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Figure 1:
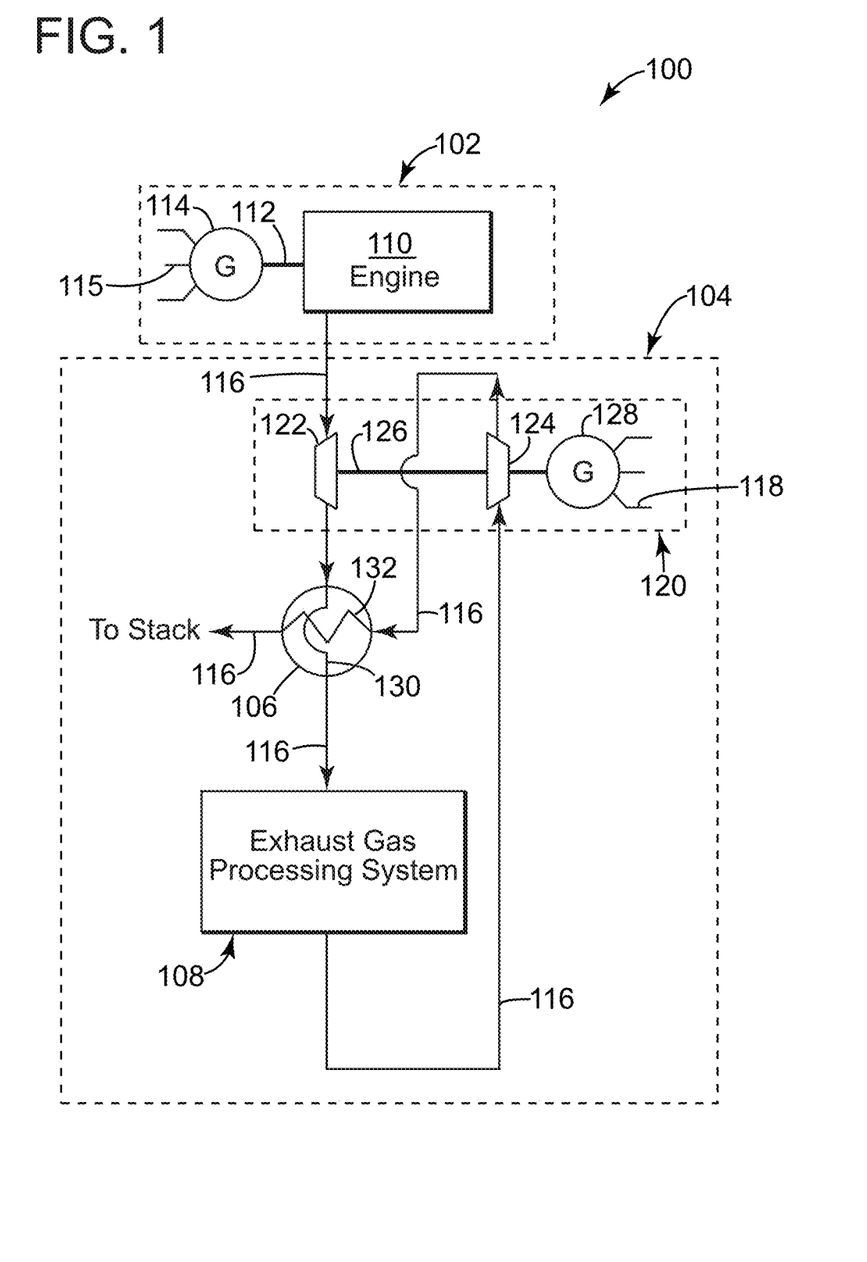
FIG. 1 is a schematic of an example of a combined power system having a primary power system and a bottoming cycle power system, wherein the bottoming cycle power system includes a turbine generator, an exhaust gas heat exchanger and an exhaust gas processing system, in accordance with the present disclosure.

Referring to FIG. 1, a schematic is depicted of an example of a combined power system 100 having a primary power system 102 and a bottoming cycle power system 104, wherein the bottoming cycle power system 104 includes a turbine generator 120, an exhaust gas heat exchanger 106 and an exhaust gas processing system 108, in accordance with the present disclosure. In this example, the bottoming cycle power system 104 is an inverted Brayton bottoming cycle power system 104.

In this specific example, the combined power system 100, primary power system 102 and bottoming cycle power system 104 are configured to generate electrical power to, for example, a grid (i.e., an interconnect network for delivering electricity from producers to consumers). However, it is within the scope of the present disclosure, that the power systems 100, 102 and 104 could be used to provide mechanical power as well.

Moreover, such power systems of the present disclosure may be used in both stationary applications and mobile applications. Examples of such stationary applications include electric generator systems for delivering electric power to a grid, electric generator systems for delivering electric power to a building, mechanical power systems for delivering mechanical power for an industrial manufacturing process or the like. Examples of such mobile applications include mechanical power systems for delivering mechanical power to a motor vehicle, electrical power systems for delivering electrical power to an electric vehicle or the like.

The primary power system 102 includes an internal combustion engine 110 having an engine crankshaft 112 that is operatively connected to a primary electric generator 114. The internal combustion engine 110 may include a turbine engine, a piston engine or similar. The engine 110 utilizes fuel in a combustion process as the motive force that rotates the engine crankshaft 112 and the primary electric generator 114 to generate a first electrical output 115. Additionally, the combustion process produces a flow of exhaust gas 116, which may be routed to the bottoming cycle power system 104. The flow of exhaust gas from the combustion process of the internal combustion engine 110 may be at, or near, atmospheric pressure and may have a temperature in the range of 850 to 950 degrees Fahrenheit (F).

Though in this example, the combustion process and associated the flow of exhaust gas 116 is utilized within a primary power system 102, other devices and/or systems may utilize a combustion process to produce exhaust gas 116. For example, the exhaust gas may be produced from a furnace system, or from burning natural gas at an oil well site or the like.

The bottoming cycle power system 106 includes a turbine generator 120. The turbine generator 120 includes a turbo-expander 122 and turbo-compressor 124 disposed on a turbo-crankshaft 126. The turbo-expander 122 is operable to receive and expand the flow of exhaust gas 116 from the combustion process of the internal combustion engine 110. The turbo-expander 122 is operable to rotate the turbo-crankshaft 126 as the exhaust gas 116 passes through the turbo-expander 122. The turbo-expander 122 expands the exhaust gas 116 to extract energy from the exhaust gas 116 and convert the energy to work on the crankshaft 126. Because the exhaust gas 116 is expanded as it passes through the turbo-expander 122, the exhaust gas 116 will be under a vacuum as it exits the turbo-expander 122, for example, at a vacuum pressure of perhaps 0.2 atmospheres. Additionally, the exhaust gas 116 will cool as it performs work on the crankshaft, for example within a range of 500-700 degrees F.

The turbo-compressor 124 (typically a turbine compressor or similar) is operatively connected to the flow of exhaust gas 116. More specifically, as the turbo-compressor 124 is rotated by the turbo-crankshaft 126, the turbo-compressor is operable to compress the flow of exhaust gas 116 after the exhaust gas passes through the turbo-expander 122, the exhaust gas heat exchanger 106 and the exhaust gas processing system 108.

Additionally, the turbo-compressor 124 pulls a vacuum on the output side of the turbo-expander 122 (for example a vacuum of about 0.2 atmospheres) to increase a pressure difference across the turbo-expander 122. The increased pressure difference enhances the expansion of the flow of exhaust gas 116 through the turbo-expander 122 in order to convert as much energy in the exhaust gas 116 into usable work on the turbo-crankshaft 126.

A bottoming cycle generator 128 is also disposed on the turbo-crankshaft 126. The bottoming cycle generator 128 is operable to generate electrical power when the turbo-crankshaft 126 is rotated by the turbo-expander 122. In other words, the bottoming cycle generator 128 generates a second electrical output 118 that may be used to supplement the first electrical output 115 of the primary power system 102.

The exhaust gas 116 flows from the turbo-expander 122 into the exhaust gas heat exchanger 106. The exhaust gas heat exchanger 106 includes a first flow path 130 and a second flow path 132 operable to exchange heat therebetween. More specifically, the first flow path 130 is operable to transfer heat into the second flow path 132. The first flow path 130 is operable to receive the flow of exhaust gas 116 from the turbo-expander 122 prior to the exhaust gas 116 being compressed by the turbo-compressor 124. The second flow path 132 is operable to receive the flow of exhaust gas 116 from the turbo-compressor 124 after the exhaust gas 116 has been compressed by the turbo-compressor 124.

As will be explained in greater detail herein, the hot exhaust gas 116 from the turbo-expander 122 (for example at about a temperature of 500-700 degrees F.), that flows through the first flow path 130 of the exhaust gas heat exchanger 106, is cooled by the much cooler exhaust gas 116 (for example at about a temperature range of 60-80 degrees F.) from the turbo-compressor 124, that flows through the second flow path 132 of the exhaust gas heat exchanger 106.

Advantageously, the cooled exhaust gas 116 from the turbo-compressor 124 provides a first stage of cooling for the hotter exhaust gas 116 from the turbo-expander 122. For example, the exhaust gas 116 may be cooled down to about a range of 200-300 degrees F. as it exits the first path 130 of the exhaust gas heat exchanger 106.

Also, advantageously, the hotter exhaust gas 116 from the turbo-expander 122 reheats the cooler exhaust gas 116 from the turbo-compressor 124 to temperatures that enable the exhaust gas 116 to flow readily up a stack 164 (see FIG. 3) of the combined power system 100. For example, the exhaust gas 116 exiting the second path 132 of the gas heat exchanger 106 may be within a range of about 250-350 degrees F.

The stack 164, as used herein, will refer to the extended exhaust piping system designed to route exhaust gas away from the source of the combustion process (in this example, the source of the combustion process is the internal combustion engine 110). In this example, the stack 164 of the combined power system 100 is designed to route the flow of exhaust gas 116 away from the combined power system 100 after the exhaust gas exits the second path 132 of the exhaust gas heat exchanger 106 (see FIG. 3).

The stack 164 of the combined power system 100 is required to route the exhaust gas 116 away from the combined power system 100 and to maintain air quality in the proximity of the combined power system 100. The stack 164, by regulation, may have a minimum height that may be as much as 1.5 times the height of a building or container that houses the engine 110 or more. If the exhaust gas 116 is too cool (for example, near or below ambient temperature), the exhaust gas 116 will be too dense to readily flow to the top of the stack 164. As will be explained in greater detail herein, cooling the exhaust gas 116 to near ambient temperature before it enters the turbo-compressor 124 is advantageous for increasing the compression ratio (and therefore efficiency) across the turbo-expander 122. However, reheating the exhaust gas 116 to temperatures that are significantly higher than ambient temperature after the exhaust gas 116 exits the turbo-compressor 124 is advantageous for routing the exhaust gas 116 up the stack 164. The exhaust gas heat exchanger 106 helps to perform both of these functions.

The exhaust gas processing system 108 is operable to receive and cool the flow of exhaust gas 116 after the exhaust gas 116 has passed through the first flow path 130 of the exhaust gas heat exchanger 106 and prior to the exhaust gas 116 being compressed by the turbo-compressor 124. The exhaust gas processing system 108 provides a second stage of cooling for the exhaust gas 116 prior to the exhaust gas 116 entering the turbo-compressor 124.

Figure 2:
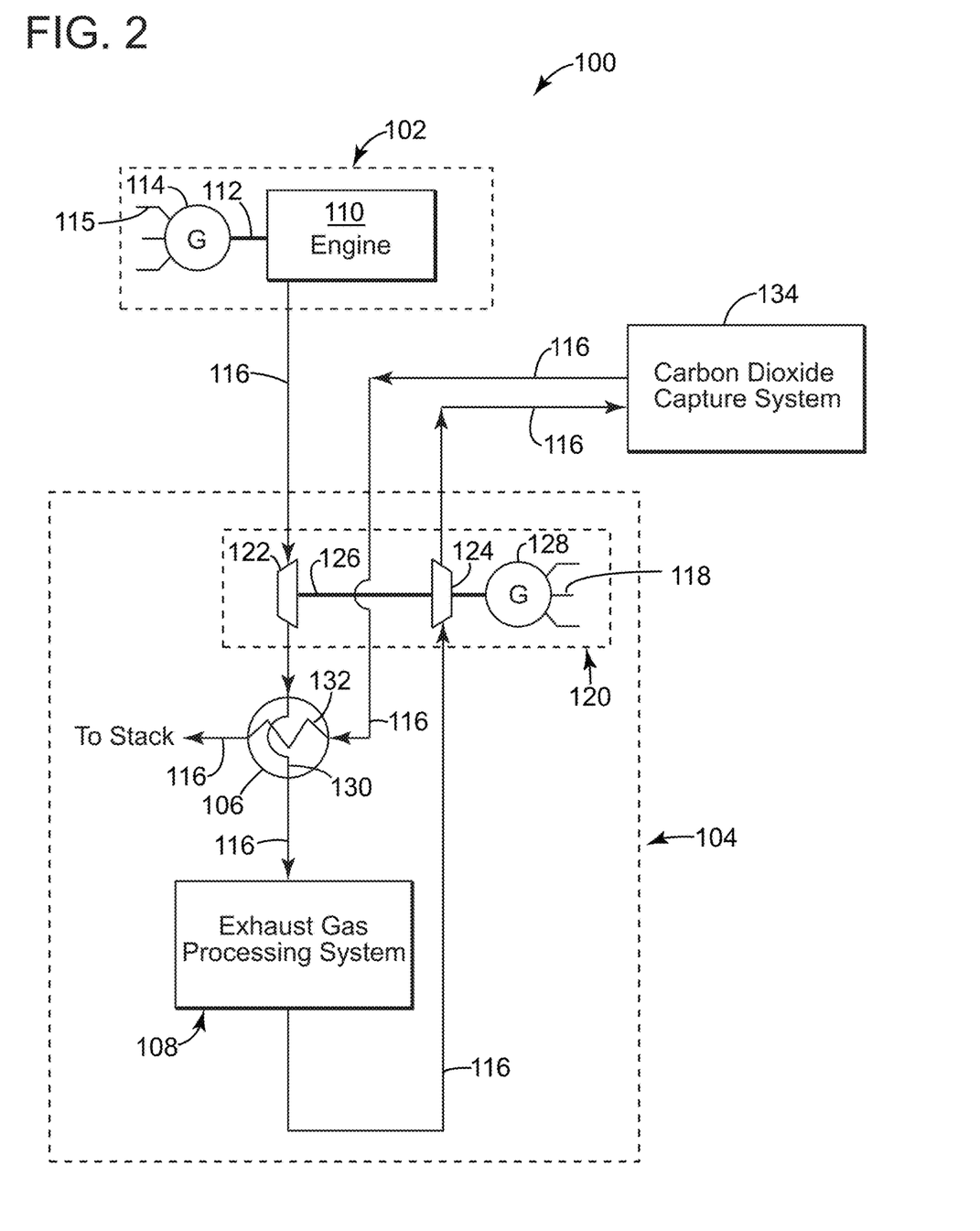
FIG. 2 is a schematic of an example of the combined power system of FIG. 1 further including a carbon dioxide capture system, in accordance with the present disclosure.

Referring to FIG. 2, a schematic of an example is depicted of the combined power system 100 of FIG. 1 further including a carbon dioxide capture system 134, in accordance with the present disclosure. The carbon dioxide capture system 134 is operable to remove and capture carbon dioxide 206 from the exhaust gas 116 after the exhaust gas 116 exits the turbo-compressor 124 and prior to the exhaust gas 116 flowing through the second flow path 132 of the exhaust gas heat exchanger 106. As will be explained in greater detail herein, the carbon dioxide capture system 134 is also operable to advantageously regenerate the captured carbon dioxide 206 using a heat of compression of a carbon dioxide compressor 220 (see FIG. 6).

Figure 3:
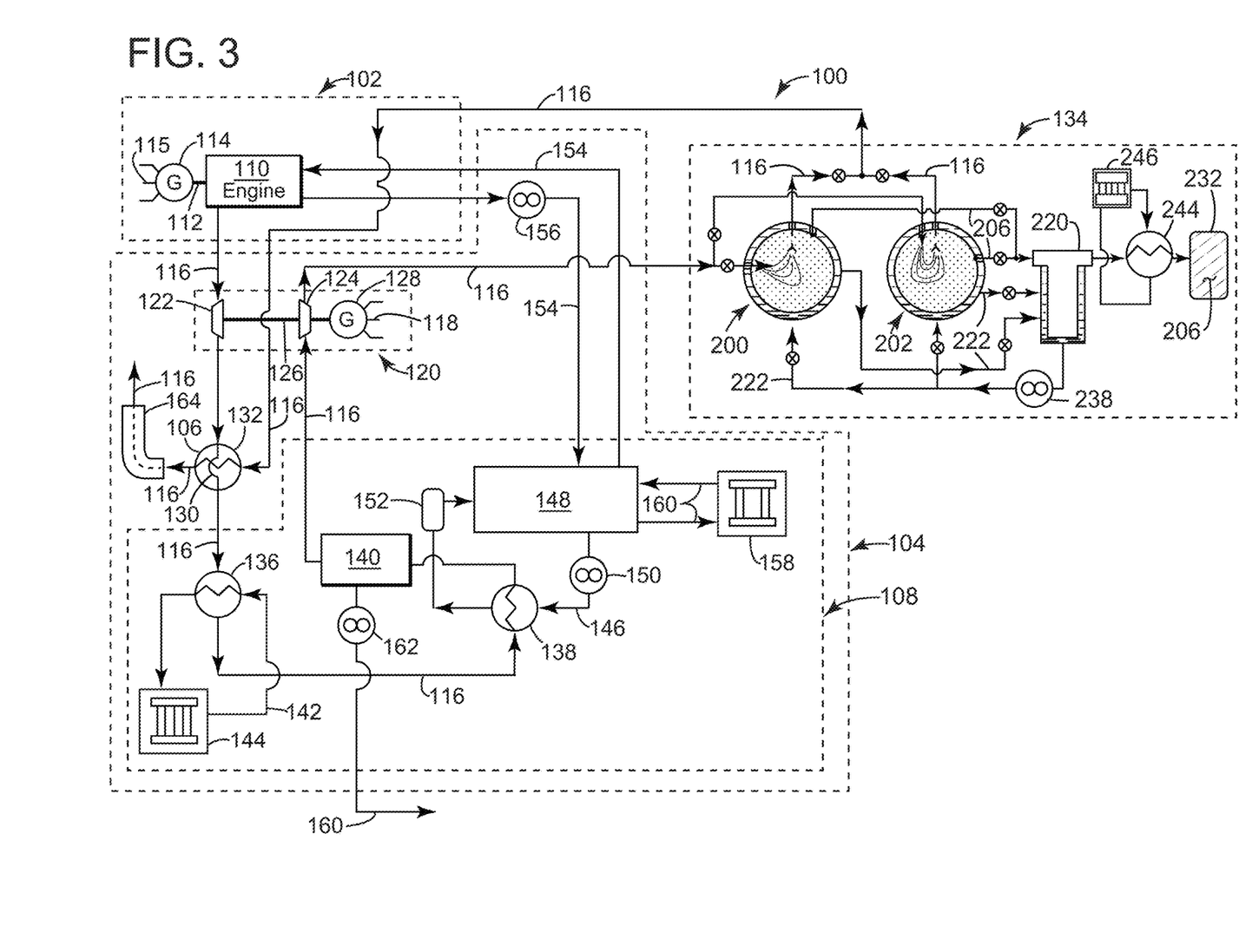
FIG. 3 is schematic of an example of the combined power system of FIG. 2, with a detailed view of the exhaust gas processing system and the carbon dioxide capture system, in accordance with the present disclosure.

Referring to FIG. 3, a schematic is depicted of an example of the combined power system 100 of FIG. 2, with a more detailed example of the exhaust gas processing system 108 and the carbon dioxide capture system 134, in accordance with the present disclosure. The exhaust gas processing system 108 performs at least a second stage of cooling on the exhaust gas 116 after the exhaust gas 116 exits the exhaust gas heat exchanger 106. However, the exhaust gas processing system 108 may perform other functions as well. For example, the exhaust gas processing system 108 may perform several stages of cooling and/or may remove water from the flow of exhaust gas 116.

In the specific example depicted in FIG. 3, the exhaust gas process system 108 includes a cooling tower heat exchanger 136, an absorption chiller heat exchanger 138 and a dehumidifier system 140 that process the exhaust gas 116 as it passes through the exhaust gas processing system 108. The cooling tower heat exchanger 136 performs a second stage of cooling on the exhaust gas 116, the absorption chiller heat exchanger 138 performs a third stage of cooling on the exhaust gas 116 and the dehumidifier system 140 removes water from the exhaust gas 116 prior to the exhaust gas entering the turbo-compressor 124.

The cooling tower heat exchanger 136 is operable to receive the flow of exhaust gas 116 from the exhaust gas heat exchanger 106. The cooling tower heat exchanger 136 is operable to cool the exhaust gas 116 with a flow of cooling tower coolant fluid 141 (see FIG. 5) that flows in a cooling tower coolant loop 142 between a cooling tower 144 and the cooling tower heat exchanger 136. In this specific example, the cooling tower coolant fluid is water, but may also be other coolants, such as glycol or the like. The cooling tower heat exchanger 106, may, for example, cool the exhaust gas down to a temperature range of about 100-130 degrees F.

From the cooling tower heat exchanger 136, the exhaust gas 116 flows to the absorption chiller heat exchanger 138. The absorption chiller heat exchanger 138 is operable to receive the flow of exhaust gas 116 from the exhaust gas heat exchanger 136 and to cool the exhaust gas 116 with a flow of absorption chiller coolant fluid (such as water, glycol or the like) that flows in an absorption chiller coolant loop 146 between an absorption chiller 148 and the absorption chiller heat exchanger 138. For example, the absorption chiller heat exchanger 136 may cool the exhaust gas 116 down to a range of about 35-45 degrees F.

A coolant pump 150 may be used to pump the absorption chiller coolant fluid around the absorption chiller coolant loop 148. An expansion tank 152 may be used to provide room for thermal expansion of the absorption chiller coolant fluid as it is circulated around the absorption chiller coolant loop 146.

The absorption chiller 148 may be powered by the heat energy from an engine coolant loop 154 of the internal combustion engine 110. More specifically, engine coolant fluid may be circulated in the engine coolant loop 154, via a coolant pump 156, between a generator section 166 (see FIG. 4) of the absorption chiller 148 and the engine 110.

Additionally, a water tower 158 may be used to remove heat energy from the absorption chiller 148. More specifically, a water tower 158 may circulate a flow of water tower coolant fluid (such as water, glycol or the like) in a water tower coolant loop 160 between the water tower 158 and the absorption chiller 148 to remove heat from an evaporator section 170 (see FIG. 4) and an absorption section 172 (see FIG. 4) of the absorption chiller 148.

In the specific example illustrated in FIG. 3, the exhaust gas 116 flows from the cooling tower heat exchanger 136 directly into the absorption chiller heat exchanger 138. However, other examples of the exhaust gas processing system 108 are within the scope of this disclosure. For example, the exhaust gas 116 may flow into the absorption chiller heat exchanger 138 first and then into the cooling tower heat exchange 136. Alternatively, there may be only an absorption chiller heat exchanger 138 or only a cooling tower heat exchanger 136 in the exhaust gas processing system 108.

Additionally, there may be other types of cooling systems utilized to cool the exhaust gas 116 in lieu of, or in place of, the cooling tower heat exchanger 136 and absorption chiller heat exchanger 138. For example, various types of vapor-compression refrigeration systems (not shown) may be utilized to cool the exhaust gas 116 in the exhaust gas processing system 108.

From the absorption chiller heat exchanger 138, the exhaust gas 116 may optionally flow through the dehumidifier system 140. The dehumidifier system 140 is operable to remove a substantial amount of water from the exhaust gas 116. The dehumidifier system may use various water absorption materials (for example lithium bromide, activated charcoal, calcium chloride, zeolites or other types of hygroscopic substances) to absorb water 160 from the exhaust gas 116. The water 160 may be pumped away from the dehumidifier system 140 via water pump 162. Though this particular example of an exhaust gas processing system 108 includes a dehumidifier system 140, it is within the scope of this disclosure that a dehumidifier system not be utilized in the exhaust gas processing system 108.

From the dehumidifier system 140, the exhaust gas 116 flows into the turbo-compressor 124. At this stage of exhaust gas flow 116, the temperature of the exhaust gas 116 has been reduced to near ambient temperatures. The near ambient temperature of the exhaust gas 116 enables the turbo-compressor 124 to efficiently pump the exhaust gas 116 back to atmospheric pressure or greater with a reduced work burden on the turbo-expander 122. For example, the exhaust gas entering the turbo-compressor 124 may be within a temperature range of about 35-45 degrees F. and may be within a pressure range of about 0.2 atmospheres or less, while the exhaust gas 116 exiting the turbo-compressor 124 may be within a temperature range of about 55-65 degree F. and may have an atmospheric pressure of about 1.5 to 2 atmospheres.

By reducing the work burden of the turbo-compressor 124 on the turbo-expander 122, the net energy produced by the bottoming cycle generator 128 is increased significantly. Additionally, the components in the exhaust gas processing system 108 (such as the cooling towers 144, 158, the cooling tower heat exchanger 136, the absorption chiller 148, the absorption chiller heater exchanger 138 and the dehumidifier system 140) are selected to consume the least amount of operating power and provide the least amount of exhaust gas pressure drop through the exhaust gas processing system. By doing so, the second electrical output 118 power of the bottoming cycle generator 128 is maximized.

As such, the second electrical output 118 of the bottoming cycle generator 128 may be operable to provide a significant portion of electric power required to operate the exhaust gas processing system 104. Additionally, the second electrical output 118 of the bottoming cycle generator 128 may be operable to provide all electric power required to operate the exhaust gas processing system 104. Additionally, the second electrical output 118 of the bottoming cycle generator 128 may be operable to provide a portion of electric power required to operate the exhaust gas processing system 108 and the carbon dioxide capture system 134. Additionally, the second electrical output 118 of the bottoming cycle generator 128 may be operable to provide all electric power required to operate the exhaust gas processing system 104 and the carbon dioxide capture system 134.

After the exhaust gas 116 exits the turbo-compressor 124, the exhaust gas 116 is routed through the carbon dioxide capture system 134. For purposes of clarity, the functional details of the carbon dioxide capture system 134 will be discussed in greater detail with reference to FIG. 6.

From the carbon dioxide capture system 134, the exhaust gas 116 flows through the second path 132 of the exhaust gas heat exchanger 106. The cooled exhaust gas 116 passing through the second path 132 is reheated by the hot exhaust gas 116 passing through the first path 130 of the exhaust gas heat exchanger 106. The reheated exhaust gas 116 exiting the second path 132 is significantly above ambient temperatures (for example, 200 to 300 degrees F.) and is significantly less dense than the ambient air. Accordingly, the reheated exhaust gas 116 may readily flow up the stack 164 of the combined power system 100.

Figure 4:
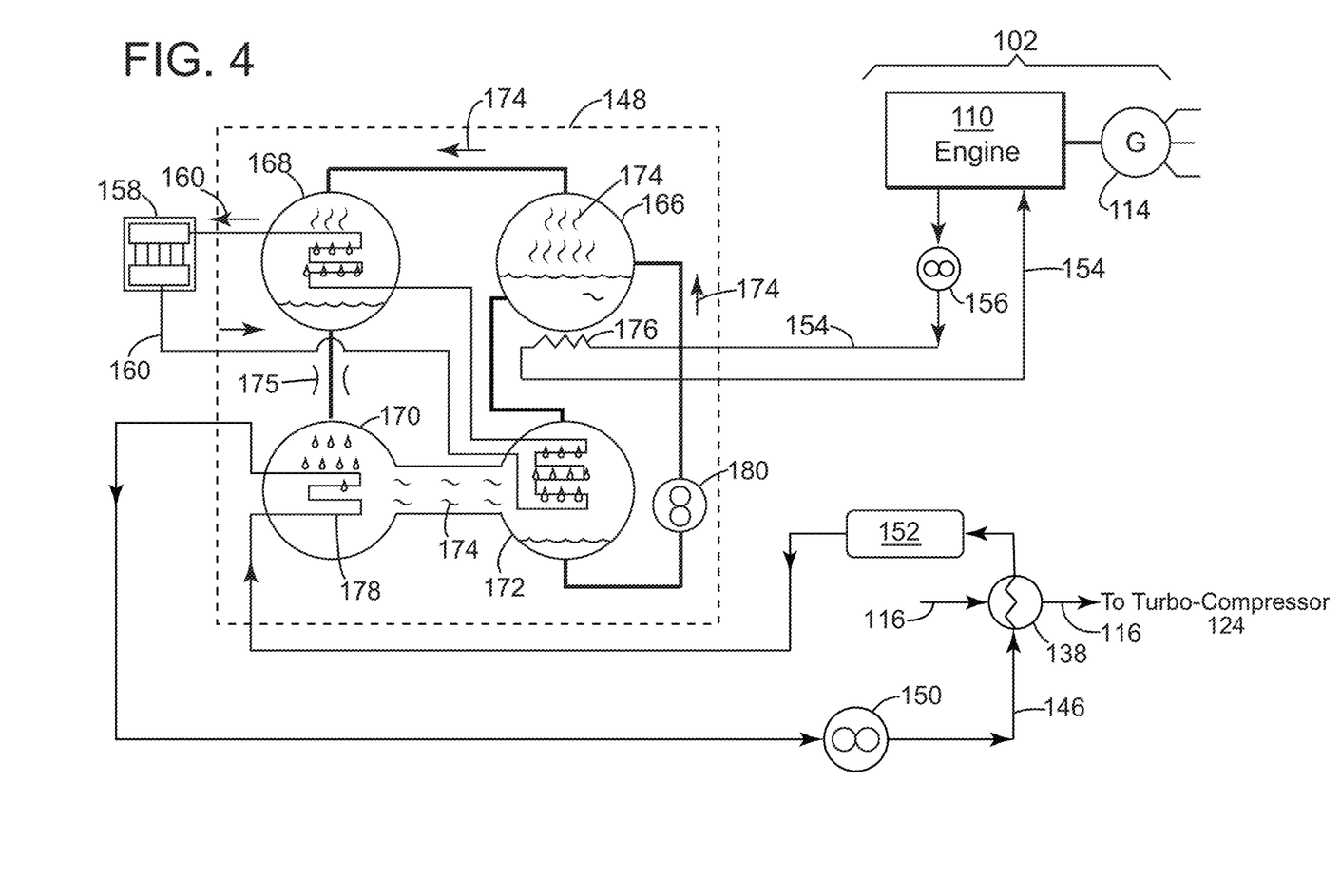
FIG. 4 is a schematic of an example of a detailed view of an absorption chiller heat exchanger and associated absorption chiller that may be utilized in the exhaust gas processing system of FIG. 3, in accordance with the present disclosure.

Referring to FIG. 4, a schematic is depicted of an example of a more detailed view of the absorption chiller heat exchanger 138 and associated absorption chiller 148 that may be utilized in the exhaust gas processing system of FIG. 3, in accordance with the present disclosure.

The absorption chiller 148 has a generator section 166, a condenser section 168, an evaporator section 170 and an absorption section 172 all in fluid communication with each other and operable to circulate an absorption chiller refrigerant 174 (in this example, water) therethrough. The generator section 166 has a generator section heat exchanger 176 to receive the flow of heated engine coolant fluid that flows in the engine coolant loop 154 between the generator section heat exchanger 176 and the internal combustion engine 110. The generator section heat exchanger 176 is operable to evaporate the absorption chiller refrigerant 174 to remove heat from the engine coolant fluid, which may enter the generator section heat exchanger at about 190 degrees F.

More specifically in this example, the heat from the hot engine coolant evaporates the water-refrigerant 174 from a dilute brine solution of water and lithium bromide. The evaporated water 174 then flows to the condenser section 168.

The condenser section 168 is operable to condense the absorption chiller refrigerant 174 utilizing the water tower coolant loop 160 of the water tower 158. The condensed water 174 flows through an orifice 175 to drop its pressure as the water 174 enters the evaporator section 170.

The evaporator section 170 has an evaporator section heat exchanger 178 to receive the absorption chiller coolant fluid from the absorption chiller heat exchanger 138. The evaporator section heat exchanger 178 is operable to remove heat from the absorption chiller coolant fluid by re-evaporating the water 174 condensed in the condenser section 168 to produce steam (i.e., evaporated absorption chiller refrigerant) 174.

The steam then flows to the absorption section 172, which contains a concentrated solution of brine that is operable to re-condense the water 174 utilizing the water tower coolant loop 160 of the water tower 158. An absorption chiller refrigerant pump 180 pumps the concentrated brine back to the generator section 166 to complete the absorption chiller refrigeration cycle.

Figure 5:
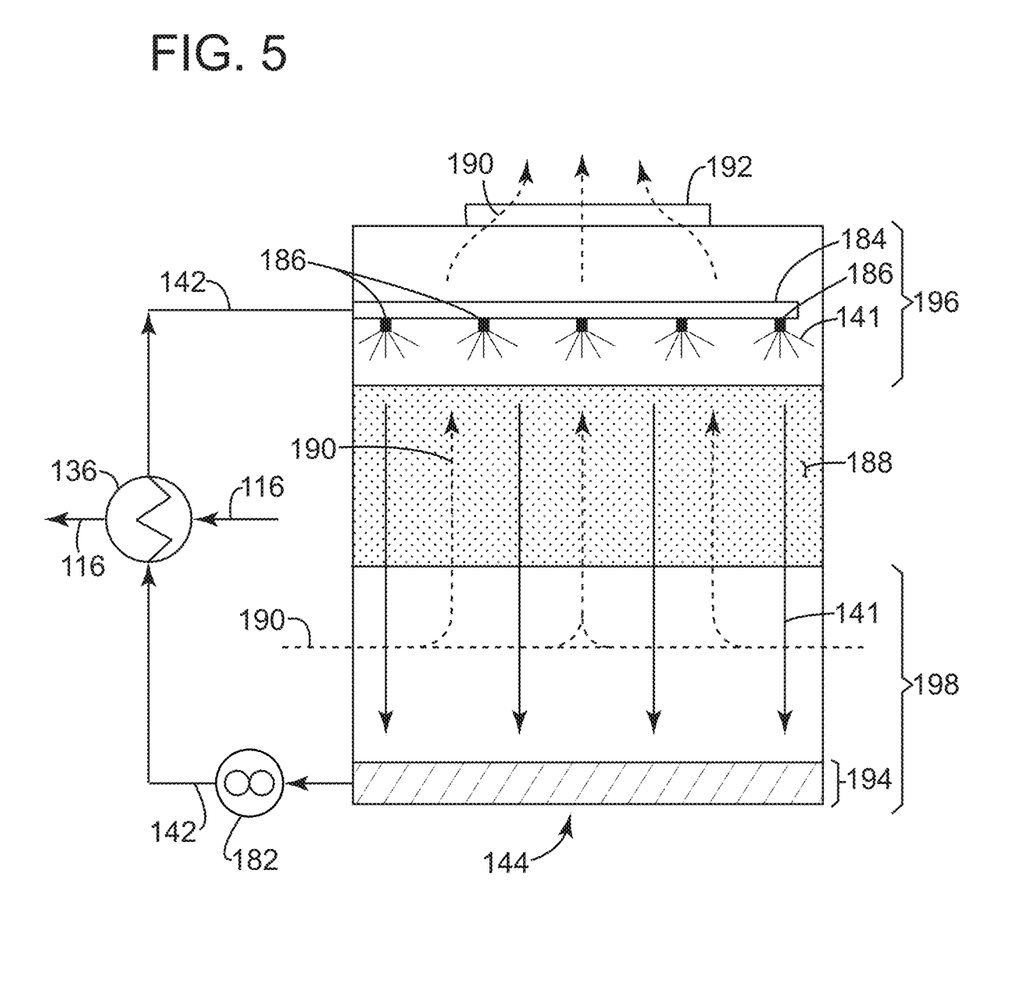
FIG. 5 is a schematic of an example of a detailed view of a cooling tower heat exchanger and associated cooling tower that may be utilized in the exhaust gas processing system of FIG. 3, in accordance with the present disclosure.

Referring to FIG. 5, a schematic is depicted of an example of a more detailed view of the cooling tower heat exchanger 136 and associated cooling tower 144 that may be utilized in the exhaust gas processing system of FIG. 3, in accordance with the present disclosure. In this specific example, the cooling tower coolant fluid 141 that flows through the cooling tower coolant loop 142 is water. However, other cooling tower coolant fluids may also be used or included with the water, such as, for example, glycol or the like.

During operation, a cooling tower coolant pump 182 may be used to circulate the water (cooling tower coolant fluid) 141 through the cooling tower coolant loop 142 between the cooling tower heat exchange and the water tower 144. The water 141 from the water tower 144 may enter the exhaust gas heat exchanger 136 in a range of about 70 to 90 degrees F. The exhaust gas 116 may enter the exhaust gas heat exchanger 136 in a range of about 200-300 degrees F. The water 141 will cool the exhaust gas 116 as the water and exhaust gas pass through the cooling tower heat exchanger 136. For example, the exhaust gas 116 may be cooled down to a range of about 100-130 degrees F. and the water may be heated up to a temperature range of about 150-180 degrees F. as both the water 141 and exhaust gas 116 pass through the cooling tower heat exchanger 136.

After passing through the cooling tower heat exchanger 136, the heated water 141 will return to the upper portion 196 of the cooling tower 144 where the water enters the cooling tower's coolant distribution system 184. The distribution system 184 will route the water 141 through a plurality of cooling tower nozzles 186, which will spray the water onto a fill material 188. The fill material (or fill media) 188 is a material used to increase the surface area of the cooling tower 144. The fill material 188 may be, for example, knitted metal wire, ceramic rings or other materials that provide a large surface area when positioned or packed together within the cooling tower 144. The fill material 188 slows the water 141 down and exposes a large amount of water surface area to air-water contact.

Ambient air 190 is pulled through a lower portion 198 of the cooling tower 144 and out the upper portion 196 of the cooling tower 144 via a cooling tower fan 192. A small amount of water 141 evaporates as the air 190 and water 141 contact each other in the fill material 188, which cools the water. For example, the water 141 may be cooled down to a range of about 70 to 90 degrees F.

The cooled water 141 falls into a collection basin 194, which adds back make-up water to compensate for the small amount of water that has been evaporated during the evaporative cooling process. The cooled water 141 is then pumped through the cooling tower coolant loop 142 and back to the cooling tower heat exchanger 136 via the cooling tower coolant pump 182 to complete the refrigeration cycle.

The cooling tower 144 may be one of several types of cooling towers, such as crossflow cooling towers, counterflow cooling towers, open loop cooling towers, closed loop cooling towers or the like. However, they most often operate utilizing evaporative cooling produced from air to cooling tower coolant fluid (e.g., water) contact.

Figure 6:
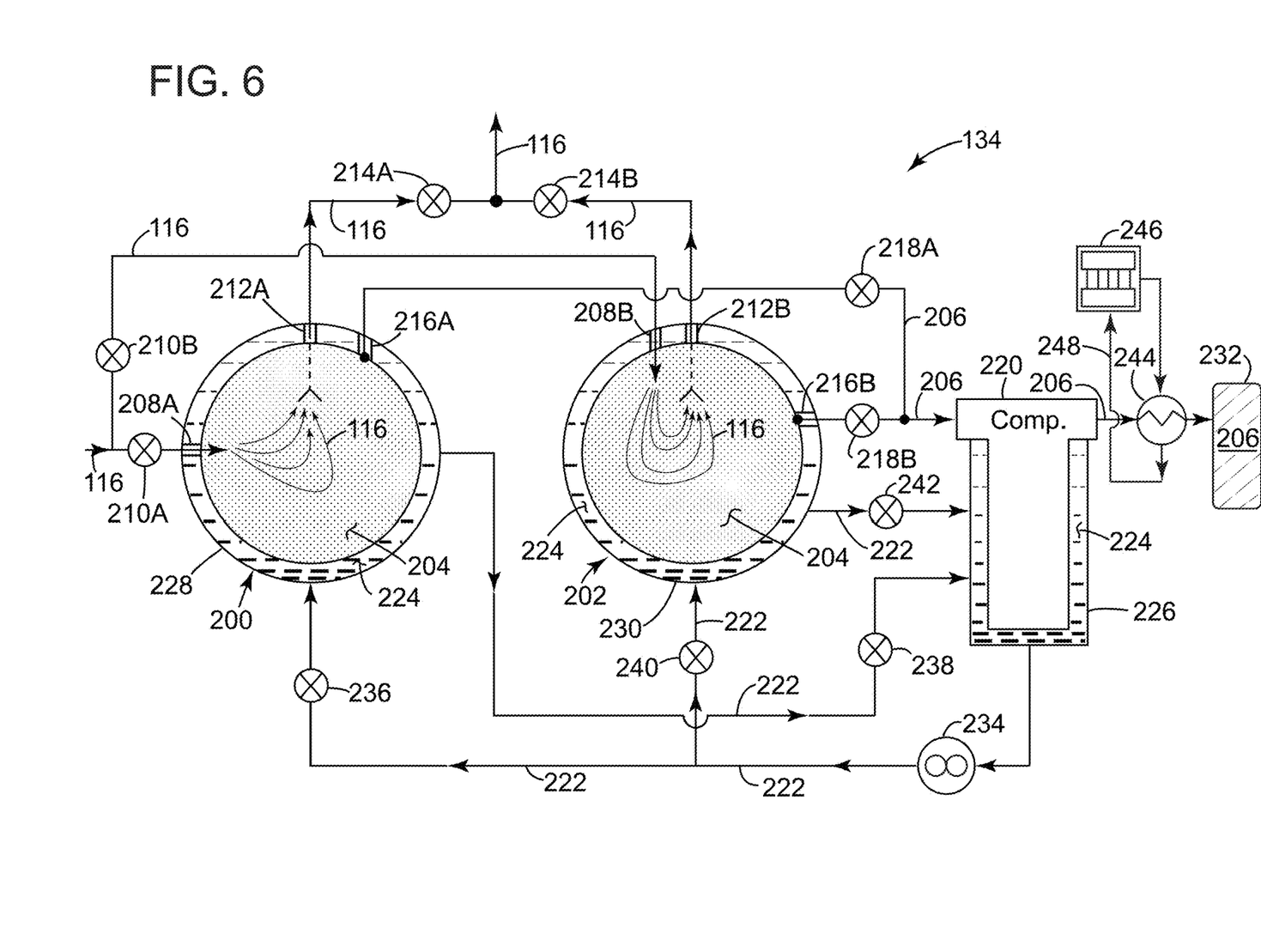
FIG. 6 is a schematic of an example of an enlarged view a carbon dioxide capture system that may be utilized in the combined power system of FIG. 3, in accordance with the present disclosure.

Referring to FIG. 6, a schematic is depicted of an example of an enlarged view of the carbon dioxide capture system 134 utilized in the combined power system 100 of FIG. 3, in accordance with the present disclosure. As the exhaust gas 116 exits the turbo-compressor 124 it will undesirably contain carbon dioxide 206. To remove the carbon dioxide 206 prior to entering the exhaust gas heat exchanger 106, the carbon dioxide capture system 136 may be utilized.

The carbon dioxide capture system 134 includes a first capture tank 200 and a second capture tank 202. Each capture tank 200, 202 contains carbon dioxide absorbent material 204 operable to absorb carbon dioxide 206 from the exhaust gas 116. The carbon dioxide absorbent material may be zeolite, metal organic frameworks material, calcium hydroxide or the like.

The first and second capture tanks 200, 202 each include an exhaust gas inlet port 208A and 208B, which are selectively connectable to the flow of exhaust gas 116 from the turbo-compressor 124. In other words, the exhaust gas inlet ports 208A and 208B are selectively connectable to the flow of exhaust gas prior to the exhaust gas passing through the carbon dioxide absorbent material. More specifically, flow valve 210A controls flow of exhaust gas 116 into the exhaust gas inlet port 208A of the first capture tank 200 and flow valve 210B controls flow of exhaust gas 116 into the exhaust gas inlet port 208B of the second capture tank 202.

The first and second capture tanks 200, 202 also include an exhaust gas outlet port 212A and 212B, which are selectively connectable to the second flow path 132 of the exhaust gas heat exchanger 106. In other words, the exhaust gas outlet ports 212A and 212B are selectively connectable to the flow of exhaust gas after the flow of exhaust gas has passed through carbon dioxide absorbent material. More specifically, flow valve 214A controls flow of exhaust gas 116 out of the exhaust gas outlet port 212A of the first capture tank 200 and into the second flow path 132 of the exhaust gas heat exchanger 106. Additionally, flow valve 214B controls flow of exhaust gas 116 out of the exhaust gas outlet port 212B of the second capture tank 202 and into the second flow path 132 of the exhaust gas heat exchanger 106.

The first and second capture tanks 200, 202 also include a carbon dioxide outlet port 216A and 216B, which are selectively connectable to a carbon dioxide compressor 220. More specifically, flow valve 218A controls flow of regenerated carbon dioxide 206 out of the carbon dioxide outlet port 216A of the first capture tank 200 and into the carbon dioxide compressor 220. Additionally, flow valve 218B controls flow of regenerated carbon dioxide 206 out of the carbon dioxide outlet port 216B of the second capture tank 202 and into the carbon dioxide compressor 220. The carbon dioxide compressor 220 is operable to pump carbon dioxide 206 out of the carbon dioxide outlet ports 216A, 216B that the carbon dioxide compressor 220 is connected to. The carbon dioxide compressor 220 may be a rotary screw type compressor, a piston compressor or the like.

A compressor coolant loop 222 is selectively connectable between the carbon dioxide compressor 220 and the first capture tank 200 or between the carbon dioxide compressor 220 and the second capture tank 202. The compressor coolant loop 222 is operable to flow a compressor coolant fluid 224 (such as water, glycol of the like) to remove a heat of compression from the compressor 220 and to transfer the heat of compression to the first or second capture tanks 200, 202. The heat of compression is operable to release a portion of the carbon dioxide 206 absorbed by the carbon dioxide absorbent material 204 in the first or second capture tanks 200, 202.

More specifically, the compressor coolant loop 222 includes a compressor coolant jacket 226 of the compressor 220, a first capture tank heating jacket 228 of the first capture tank 200 and a second capture tank heating jacket 230 of the second capture tank 202. The compressor coolant jacket 226 is operable to contain and circulate the compressor coolant fluid 224 around the outer surface of the compressor 220 to cool the compressor 220. The compressor coolant fluid 224 will remove the heat of compression from the compressor 220.

For purposes herein, a heating or coolant jacket (such as coolant jacket 226, and heating jackets 228 and 230) may refer to an outer casing or system of tubing, which holds fluid and through which the fluid circulates to cool or heat a vessel or device. For example, the compressor coolant jacket 226 may be a casing which surrounds the carbon dioxide compressor 220 to enable the coolant fluid to absorb the heat of compression and to cool the compressor 220. Also, the first and second capture tank heating jackets 228 and 230 may be casings or systems of tubing, which are operable to transfer the heat of compression to the selected first or second capture tanks 200, 202 and to heat the carbon dioxide 206 captured within the selected tank 200, 202.

The heating jackets 228 and 230 are operable to selectively contain and circulate the compressor coolant fluid 224 (which is heated with the heat of compression from compressor 220) around the outer surfaces of the first or second capture tanks 200, 202 respectively to heat the selected capture tank 200, 202. The compressor coolant fluid 224 will add the heat of compression to the selected capture tank 200, 202. The heat of compression from the compressor 220 will then advantageously be used to regenerate (or desorb) a portion, or substantially all, of the carbon dioxide 206 from the carbon dioxide absorbent material 204 so that it can be pumped by the compressor 220 into a holding tank 232 for later use and/or disposal.

A carbon dioxide heat exchanger 244 may be disposed between the holding tank 232 and the carbon dioxide compressor 220 to cool the carbon dioxide 206 prior to entering the holding tank 232. The carbon dioxide heat exchanger 244 may be cooled by a cooling tower 246 that circulates coolant fluid between the cooling tower 246 and the carbon dioxide heat exchanger 244 via carbon dioxide heat exchanger coolant loop 248.

The compressor coolant fluid 224 is pumped around the compressor coolant loop 222 via pump 234. Flow valves 236, 238, 240 and 242 control the flow of compressor coolant fluid 224 to either the first capture tank 200 or second capture tank 202. More specifically, when valves 236 and 238 are open, and valves 240 and 242 are closed, the coolant loop 222 circulates the coolant fluid 224 via pump 234 between the compressor 220 and the first capture tank 200. In this configuration, the compressor 220 is cooled and the first capture tank 200 is heated. When the valves 236 and 238 are closed, and valves 240 and 242 are open, the coolant loop 222 circulates the coolant fluid 224 via pump 234 between the compressor 220 and the second capture tank 202. In this configuration, the compressor 220 is cooled and the second capture tank 202 is heated.

During operation, the various flow valves may be configured such that the exhaust gas inlet port 208A of the first capture tank 200 is connected (i.e., in fluid communication) to the flow of exhaust gas 116 from the turbo-compressor 124. In other words, the exhaust gas inlet port 208A is connected to the flow of exhaust gas 116 prior to the exhaust gas 116 passing through the carbon dioxide absorbent material 204. Additionally, the first capture tank's exhaust gas outlet port 212A is connected (i.e., in fluid communication) to the second flow path 132 of the exhaust gas heat exchanger 106. In other words, the exhaust gas outlet port 212A is connected to the flow of exhaust gas 116 after the exhaust gas has passed through the carbon dioxide absorbent material 204. Additionally, the carbon dioxide compressor 220 may be connected to the carbon dioxide outlet port 216B of the second capture tank 202 and the compressor coolant loop 222 may be connected between the carbon dioxide compressor 220 and the second capture tank 202. In this configuration, exhaust gas 116 will flow into the first capture tank 200 to remove the carbon dioxide 206 from the exhaust gas 116 flow prior to entering the exhaust gas heat exchanger 106. Simultaneously, the heat of compression from the carbon dioxide compressor 220 will advantageously be used to heat the second capture tank 202 to regenerate the carbon dioxide from the second capture tank 202 and to pump the carbon dioxide 206 into the holding tank 232. By using the heat of compression of the carbon dioxide compressor 220 to regenerate the carbon dioxide in the second capture tank 202, the energy needed from external sources (such as electric heaters or the like) to regenerate the carbon dioxide is advantageously reduced.

Also during operation, the various flow valves may be configured such that the exhaust gas inlet port 208B of the second capture tank 202 is connected (i.e., in fluid communication) to the flow of exhaust gas 116 from the turbo-compressor 124. In other words, the exhaust gas inlet port 208B is connected to the flow of exhaust gas 116 prior to the exhaust gas 116 passing through the carbon dioxide absorbent material 204. Additionally, the second capture tank's exhaust gas outlet port 212B is connected (i.e., in fluid communication) to the second flow path 132 of the exhaust gas heat exchanger 106. In other words, exhaust gas outlet port 212B is connected to the flow of exhaust gas 116 after the exhaust gas 116 has passed through the carbon dioxide absorbent material 204. Additionally, the carbon dioxide compressor 220 may be connected to the carbon dioxide outlet port 216A of the first capture tank 200 and the compressor coolant loop 222 may be connected between the carbon dioxide compressor 220 and the first capture tank 200. In this configuration, exhaust gas will flow into the second capture tank 202 to remove the carbon dioxide 206 from the exhaust gas 116 flow prior to entering the exhaust gas heat exchanger 106. Simultaneously, the heat of compression from the carbon dioxide compressor 220 will advantageously be used to heat the first capture tank 200 to regenerate the carbon dioxide from the first capture tank 200 and pump the carbon dioxide into the holding tank 232. By using the heat of compression of the carbon dioxide compressor 220 to regenerate the carbon dioxide in the first capture tank 200, the energy needed from external sources (such as electric heaters or the like) to regenerate the carbon dioxide is advantageously reduced.

It should be appreciated that all combinations of the foregoing concepts and additional concepts discussed in greater detail herein (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

Although the invention has been described by reference to specific examples, it should be understood that numerous changes may be made within the spirit and scope of the inventive concepts described. Accordingly, it is intended that the disclosure not be limited to the described examples, but that it have the full scope defined by the language of the following claims.

What is claimed is:

1. A bottoming cycle power system comprising:
   a turbine-generator comprising a turbo-expander and turbo-compressor disposed on a turbo-crankshaft, wherein:
   the turbo-expander operates to rotate the turbo-crankshaft as a flow of exhaust gas from a combustion process passes through the turbo-expander, and
   the turbo-compressor operates to compress the flow of exhaust gas after the exhaust gas passes through the turbo-expander; and
   an exhaust gas heat exchanger comprising a first flow path and a second flow path which operate to exchange heat therebetween, wherein:
   the first flow path operates to receive the flow of exhaust gas from the turbo-expander prior to the exhaust gas being compressed by the turbo-compressor, and
   the second flow path operates to receive the flow of exhaust gas from the turbo-compressor after the exhaust gas has been compressed by the turbo-compressor.

2. The bottoming cycle power system of claim 1, wherein:
   a cooling tower heat exchanger operates to receive the flow of exhaust gas from the exhaust gas heat exchanger and to cool the exhaust gas with a flow of cooling tower coolant fluid that flows in a cooling tower coolant loop between a cooling tower and the cooling tower heat exchanger.

3. The bottoming cycle power system of claim 2, wherein: an absorption chiller heat exchanger operates to receive the flow of exhaust gas from the cooling tower heat exchanger and to cool the exhaust gas with a flow of absorption chiller coolant fluid that flows in an absorption chiller coolant loop between an absorption chiller and the absorption chiller heat exchanger.

4. The bottoming cycle power system of claim 1, wherein: an absorption chiller heat exchanger operates to receive the flow of exhaust gas from the exhaust gas heat exchanger and to cool the exhaust gas with a flow of absorption chiller coolant fluid that flows in an absorption chiller coolant loop between an absorption chiller and the absorption chiller heat exchanger.

5. The bottoming cycle power system of claim 4, comprising:
the absorption chiller further comprising a generator section, a condenser section, an evaporator section and an absorption section all in fluid communication with each other and which operate to circulate an absorption chiller refrigerant therethrough, wherein:
the generator section has a generator section heat exchanger to receive a flow of engine coolant fluid that flows in an engine coolant loop between the generator section heat exchanger and an internal combustion engine, the internal combustion engine generating the flow of exhaust gas, the generator section heat exchanger operates to evaporate the absorption chiller refrigerant to remove heat from the engine coolant fluid;
the condenser section operates to condense the absorption chiller refrigerant;
the evaporator section has an evaporator section heat exchanger to receive the absorption chiller coolant fluid from the absorption chiller heat exchanger, the evaporator section heat exchanger operates to remove heat from the absorption chiller coolant fluid by re-evaporating the absorption chiller refrigerant; and
the absorption section operates to re-condense the absorption chiller refrigerant.

6. The bottoming cycle power system of claim 1 comprising a carbon dioxide capture system, the carbon dioxide capture system comprising:
a first capture tank containing carbon dioxide absorbent material which operates to absorb carbon dioxide from the exhaust gas, the first capture tank comprising:
an exhaust gas inlet port connected to the flow of exhaust gas from the turbo-compressor,
an exhaust gas outlet port connected to the second flow path of the exhaust gas heat exchanger, and
a carbon dioxide outlet port;
a carbon dioxide compressor connected to the carbon dioxide outlet port of the first capture tank, the carbon dioxide compressor operates to pump carbon dioxide out of the carbon dioxide outlet port; and
a compressor coolant loop connected between the carbon dioxide compressor and the first capture tank, the compressor coolant loop operates to flow a compressor coolant fluid to remove heat of compression from the compressor and to transfer the heat of compression to the first capture tank, wherein the heat of compression operates to release a portion of the carbon dioxide absorbed by the carbon dioxide absorbent material in the first capture tank.

7. The bottoming cycle power system of claim 6, wherein the turbine-generator comprises:
a bottoming cycle generator disposed on the turbo-crankshaft, the bottoming cycle generator connected to the carbon dioxide capture system, the bottoming cycle generator operates to provide a portion of electric power required to operate the carbon dioxide capture system.

8. The bottoming cycle power system of claim 7, wherein the bottoming cycle generator operates to provide all electric power required to operate the carbon dioxide capture system.

9. The bottoming cycle power system of claim 1 comprising a carbon dioxide capture system, the carbon dioxide capture system comprising:
a first capture tank and a second capture tank, each of the first capture tank and the second capture tank containing carbon dioxide absorbent material which operates to absorb carbon dioxide from the exhaust gas, the first capture tank and the second capture tank each comprising:
an exhaust gas inlet port connected to the flow of exhaust gas from the turbo-compressor,
an exhaust gas outlet port connected to the second flow path of the exhaust gas heat exchanger, and
a carbon dioxide outlet port;
a carbon dioxide compressor connected to the carbon dioxide outlet port of either the first capture tank or the second capture tank, the carbon dioxide compressor operates to pump carbon dioxide out of the carbon dioxide outlet port that the carbon dioxide compressor is connected to; and
a compressor coolant loop connected between the carbon dioxide compressor and the first capture tank or between the carbon dioxide compressor and the second capture tank, the compressor coolant loop operates to flow a compressor coolant fluid to remove heat of compression from the compressor and to transfer the heat of compression to the first capture tank or the second capture tank, wherein the heat of compression operates to release a portion of the carbon dioxide absorbed by the carbon dioxide absorbent material in the first capture tank or the second capture tank.

10. The bottoming cycle power system of claim 9, wherein:
when the exhaust gas inlet port of the first capture tank is connected to receive the flow of exhaust gas from the turbo-compressor, then the exhaust gas outlet port of the first capture tank is connected to output the flow of exhaust gas to the second flow path of the exhaust gas heat exchanger, the carbon dioxide compressor is connected to the carbon dioxide outlet port of the second capture tank and the compressor coolant loop is connected between the carbon dioxide compressor and the second capture tank; and
when the exhaust gas inlet port of the second capture tank is connected to receive the flow of exhaust gas from the turbo-compressor, then the exhaust gas outlet port of the second capture tank is connected to output the flow of exhaust gas to the second flow path of the exhaust gas heat exchanger, the carbon dioxide compressor is connected to the carbon dioxide outlet port of the first capture tank and the compressor coolant loop is connected between the carbon dioxide compressor and the first capture tank.

11. A combined power system comprising:
a primary power system including an internal combustion engine having a rotatable crankshaft, the engine operating to combust fuel in a combustion process to deliver primary power to the engine crankshaft, the combustion process producing a flow of exhaust gas; and
a bottoming cycle power system comprising:
  a turbine-generator comprising a turbo-expander and turbo-compressor disposed on a turbo-crankshaft, wherein:
    the turbo-expander operates to rotate the turbo-crankshaft as the flow of exhaust gas from the combustion process passes through the turbo-expander, and
    the turbo-compressor operates to compress the flow of exhaust gas after the exhaust gas passes through the turbo-expander, and
  an exhaust gas heat exchanger comprising a first flow path and a second flow path which operate to exchange heat therebetween, wherein:
    the first flow path operates to receive the flow of exhaust gas from the turbo-expander prior to the exhaust gas being compressed by the turbo-compressor, and
    the second flow path operates to receive the flow of exhaust gas from the turbo-compressor after the exhaust gas has been compressed by the turbo-compressor.

12. The combined power system of claim 11, comprising:
a cooling tower heat exchanger which operates to receive the flow of exhaust gas from the exhaust gas heat exchanger and to cool the exhaust gas with a flow of cooling tower coolant fluid that flows in a cooling tower coolant loop between a cooling tower and the cooling tower heat exchanger.

13. The combined power system of claim 11, comprising:
an absorption chiller heat exchanger which operates to receive the flow of exhaust gas from the exhaust gas heat exchanger and to cool the exhaust gas with a flow of absorption chiller coolant fluid that flows in an absorption chiller coolant loop between an absorption chiller and the absorption chiller heat exchanger.

14. The combined power system of claim 13, comprising:
the absorption chiller further comprising a generator section, a condenser section, an evaporator section and an absorption section all in fluid communication with each other and which operate to circulate an absorption chiller refrigerant therethrough, wherein:
  the generator section has a generator section heat exchanger to receive a flow of engine coolant fluid that flows in an engine coolant loop between the generator section heat exchanger and the internal combustion engine of the primary power system, the generator section heat exchanger operates to evaporate the absorption chiller refrigerant to remove heat from the engine coolant fluid;
  the condenser section operates to condense the absorption chiller refrigerant;
  the evaporator section has an evaporator section heat exchanger to receive the absorption chiller coolant fluid from the absorption chiller heat exchanger, the evaporator section heat exchanger operates to remove heat from the absorption chiller coolant fluid by re-evaporating the absorption chiller refrigerant; and
  the absorption section operates to re-condense the absorption chiller refrigerant.

15. The combined power system of claim 11 comprising a carbon dioxide capture system, the carbon dioxide capture system comprising:
  a first capture tank containing carbon dioxide absorbent material which operates to absorb carbon dioxide from the exhaust gas, the first capture tank comprising:
    an exhaust gas inlet port connected to the flow of exhaust gas from the turbo-compressor,
    an exhaust gas outlet port connected to the second flow path of the exhaust gas heat exchanger, and
    a carbon dioxide outlet port;
  a carbon dioxide compressor connected to the carbon dioxide outlet port of the first capture tank, the carbon dioxide compressor operates to pump carbon dioxide out of the carbon dioxide outlet port; and
  a compressor coolant loop connected between the carbon dioxide compressor and the first capture tank, the compressor coolant loop operates to flow a compressor coolant fluid to remove heat of compression from the compressor and to transfer the heat of compression to the first capture tank, wherein the heat of compression operates to release a portion of the carbon dioxide absorbed by the carbon dioxide absorbent material in the first capture tank.

16. The combined power system of claim 15, wherein the turbine-generator comprises:
  a bottoming cycle generator disposed on the turbo-crankshaft, the bottoming cycle generator connected to the carbon dioxide capture system, the bottoming cycle generator operates to provide all electric power required to operate the carbon dioxide capture system.

17. The combined power system of claim 11 comprising a carbon dioxide capture system, the carbon dioxide capture system comprising:
  a first capture tank and a second capture tank, each of the first capture tank and the second capture tank containing carbon dioxide absorbent material which operates to absorb carbon dioxide from the exhaust gas, the first capture tank and the second capture tank each comprising:
    an exhaust gas inlet port connected to the flow of exhaust gas from the turbo-compressor,
    an exhaust gas outlet port connected to the second flow path of the exhaust gas heat exchanger, and
    a carbon dioxide outlet port;
  a carbon dioxide compressor connected to the carbon dioxide outlet port of either the first capture tank or the second capture tank, the carbon dioxide compressor operates to pump carbon dioxide out of the carbon dioxide outlet port that the carbon dioxide compressor is connected to; and
  a compressor coolant loop connected between the carbon dioxide compressor and the first capture tank or between the carbon dioxide compressor and the second capture tank, the compressor coolant loop operates to flow a compressor coolant fluid to remove heat of compression from the compressor and to transfer the heat of compression to the first capture tank or the second capture tank, wherein the heat of compression operates to release a portion of the carbon dioxide absorbed by the carbon dioxide absorbent material in the first capture tank or the second capture tank.

18. The bottoming cycle power system of claim 17, wherein:
  when the exhaust gas inlet port of the first capture tank is connected to receive the flow of exhaust gas from the turbo-compressor, then the exhaust gas outlet port of the first capture tank is connected to output the flow of exhaust gas to the second flow path of the exhaust gas heat exchanger, the carbon dioxide compressor is connected to the carbon dioxide outlet port of the second capture tank and the compressor coolant loop is connected between the carbon dioxide compressor and the second capture tank; and when the exhaust gas inlet port of the second capture tank is connected to receive the flow of exhaust gas from the turbo-compressor, then the exhaust gas outlet port of the second capture tank is connected to output the flow of exhaust gas to the second flow path of the exhaust gas heat exchanger, the carbon dioxide compressor is connected to the carbon dioxide outlet port of the first capture tank and the compressor coolant loop is connected between the carbon dioxide compressor and the first capture tank.

19. A carbon dioxide capture system comprising:

a first capture tank containing carbon dioxide absorbent material which operates to absorb carbon dioxide from a flow of exhaust gas, the first capture tank comprising:

an exhaust gas inlet port connected to the flow of exhaust gas prior to the exhaust gas passing through the carbon dioxide absorbent material, an exhaust gas outlet port connected to the flow of exhaust gas after the flow of exhaust gas has passed through carbon dioxide absorbent material, and a carbon dioxide outlet port;

a carbon dioxide compressor connected to the carbon dioxide outlet port of the first capture tank, the carbon dioxide compressor operates to pump carbon dioxide out of the carbon dioxide outlet port that the carbon dioxide compressor is connected to; and a compressor coolant loop connected between the carbon dioxide compressor and the first capture tank, the compressor coolant loop operates to flow a compressor coolant fluid to remove heat of compression from the compressor and to transfer the heat of compression to the first capture tank, wherein the heat of compression operates to release a portion of the carbon dioxide absorbed by the carbon dioxide absorbent material in the first capture tank.

* * * * *